Oct. 15, 1963     A. H. WILLINGER     3,107,290
AQUARIUM HEATER
Filed Jan. 3, 1961     3 Sheets-Sheet 1
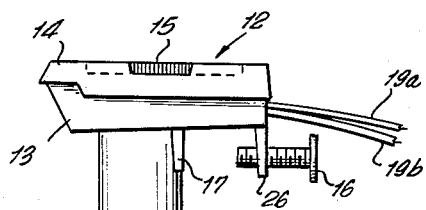
FIG.1
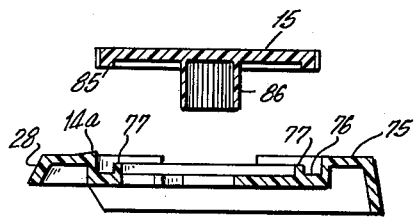
FIG.3
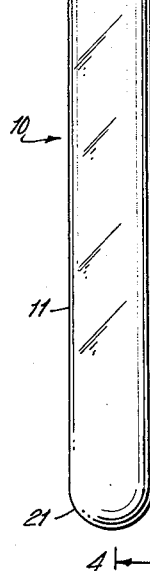
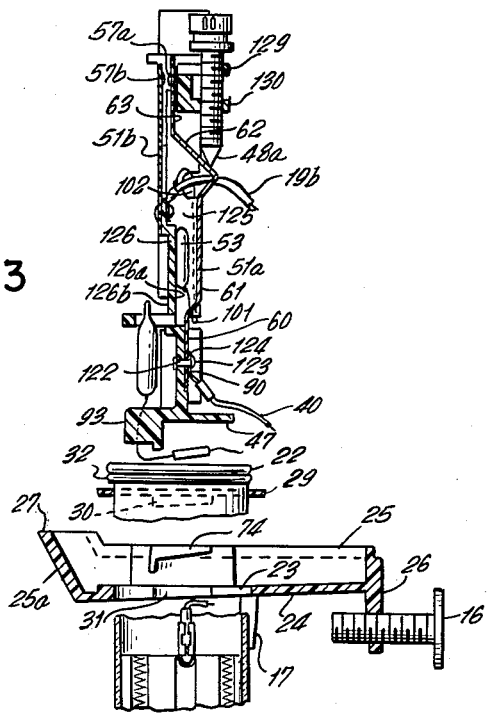
FIG.2
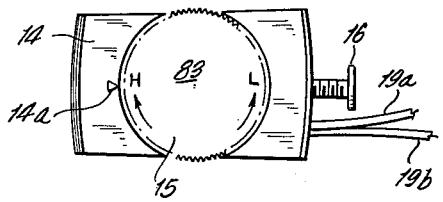
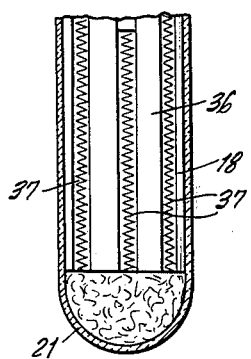
FIG.7
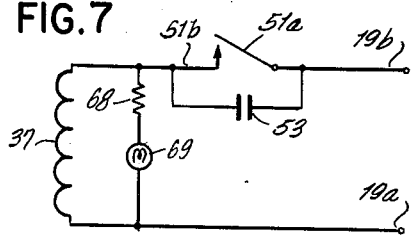
INVENTOR.
ALLAN H. WILLINGER
BY
ATTORNEY

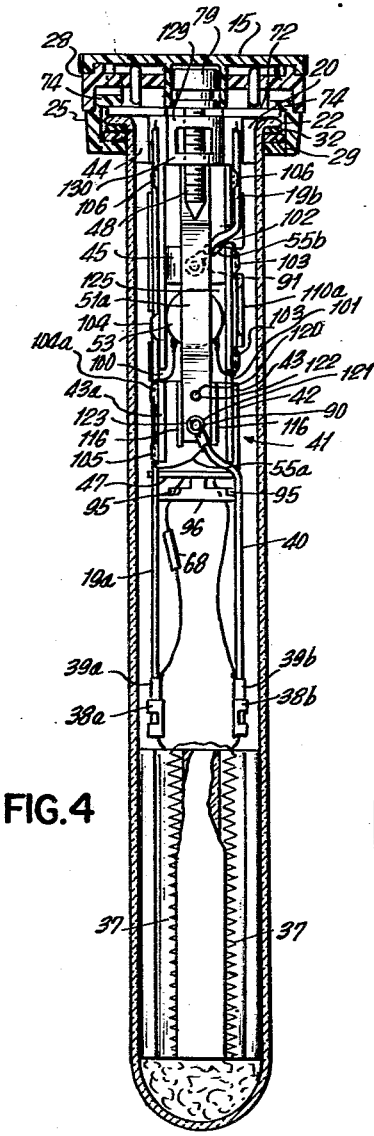
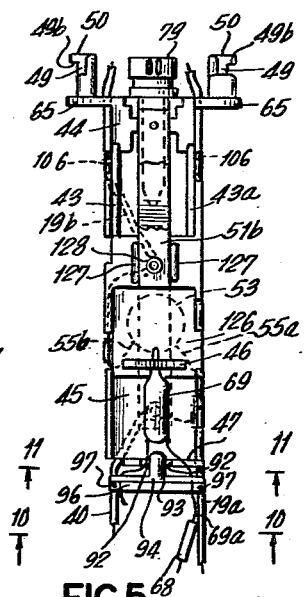
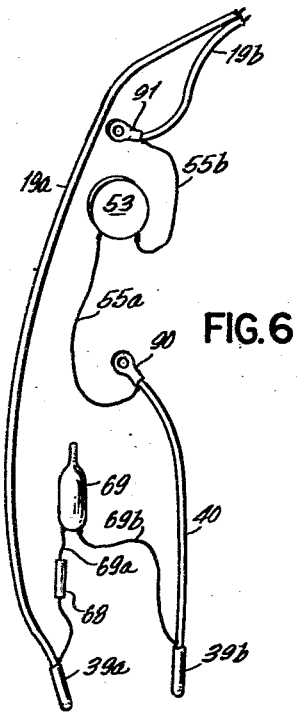
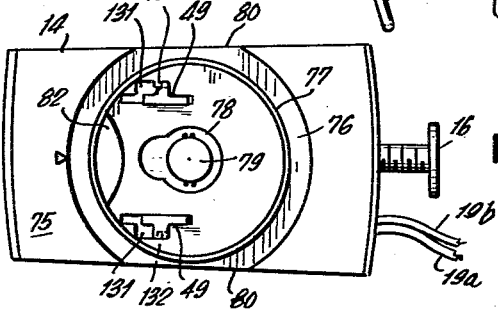
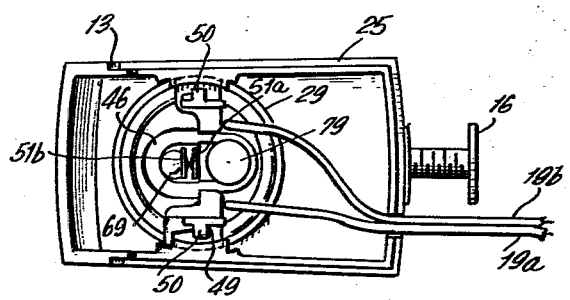
Oct. 15, 1963  A. H. WILLINGER  3,107,290
AQUARIUM HEATER
Filed Jan. 3, 1961  3 Sheets-Sheet 2
FIG. 4
FIG. 5
FIG. 6
FIG. 8
FIG. 9
INVENTOR.
ALLAN H. WILLINGER
BY
ATTORNEY Oct. 15, 1963   A. H. WILLINGER   3,107,290
AQUARIUM HEATER
Filed Jan. 3, 1961   3 Sheets-Sheet 3
FIG. 10
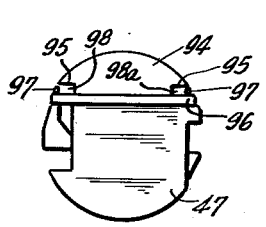
FIG. 11
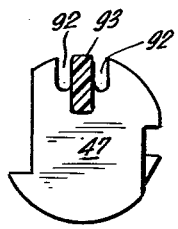
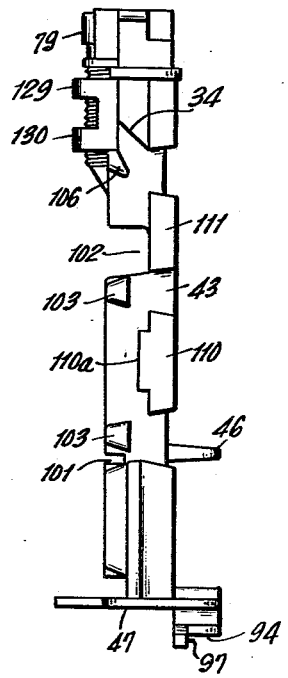
FIG. 12
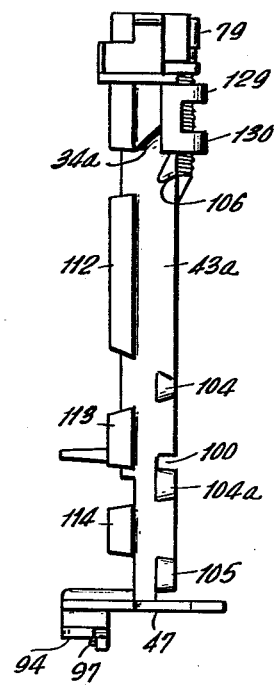
FIG. 13
INVENTOR.
ALLAN H. WILLINGER
BY
ATTORNEY _United States Patent Office_  3,107,290
Patented Oct. 15, 1963

1

3,107,290
AQUARIUM HEATER
Allan H. Willinger, New Rochelle, N.Y., assignor to Aquariums Incorporated, a corporation of Delaware
Filed Jan. 3, 1961, Ser. No. 80,377
4 Claims. (Cl. 219—41)

This invention relates generally to an aquarium heater and particularly to a heater of this type having temperature control means.

It is accepted practice among aquarium hobbyists to utilize heating devices for raising the temperature of aquaria to desired levels most suitable for the maintenance and propagation of the fish contained therein. To this end, such heating devices are provided with control means which are responsive to the changes in the temperature of the aquarium water in order to maintain the same at a constant level. The most convenient and economical form of temperature responsive control element has been found to be a bi-metallic strip interposed in the heater element circuit which is deflected in accordance with changes in temperature and makes and breaks associated electrical contact members. However, thermostatically controlled heaters employing such an element often require complex physical arrangements to accord with the wiring system associated therewith and the limited space usually available for such heaters. Moreover, these arrangements unduly encumber the operations involved in the assembly of such heaters.

Accordingly, it is an object of this invention to provide a thermostatically controlled aquarium heating device which may be readily and economically produced and assembled on a large scale.

It is also an object of this invention to provide a device of this character which has an improved arrangement for supporting a harness which includes the wiring system associated therewith.

Another object of the invention is to provide an improve harness of the character indicated.

Another object of the invention is to provide improved means for affording ready access to the interior of a heater of the character indicated and to the said harness and other operative parts contained therein.

Another object of the invention is to provide an improved mode of assembly of a heater of the character indicated.

It is also an object of the invention to provide a device of the character indicated which is efficient in operation, attractive in appearance and one wherein many of the parts may be formed of a plastic material.

Yet a further object of the invention is to provide a device of the character indicated wherein an indicator is provided to indicate the operational condition of the heating element.

Other and more specific objects of the present invention will be apparent from the following description as read in connection with the accompanying drawings.

In the drawings:

FIGURE 1 is a side elevational view of an embodiment of a thermostatically controlled aquarium heater in accordance with the present invention;

FIGURE 2 is a plan view thereof;

FIGURE 3 is an exploded elevational view, shown in cross-section, of the form of the invention depicted in FIGURE 1;

FIGURE 4 is a cross-sectional view taken about the line 4—4 of FIGURE 1;

FIGURE 5 is an elevational view of the harness support employed in the aforesaid form of the invention;

FIGURE 6 is a perspective view of the physical arrangement of the said harness prior to its assembly with the remaining portions of the invention;

2

FIGURE 7 is a diagrammatic view of the wiring system comprised in said harness;

FIGURE 8 is a plan view taken about the line 8—8 of FIGURE 1, the temperature adjusting knob, however, being removed from said view;

FIGURE 9 is a plan view similar to that of FIGURE 8 but both the temperature adjusting knob and the top cover being removed from said view;

FIGURE 10 is a cross-sectional view taken about the line 10—10 of FIGURE 5;

FIGURE 11 is a cross-sectional view taken about the line 11—11 of FIGURE 5;

FIGURE 12 is a left end view of the thermostatic control chassis depicted in FIGURE 5; and FIGURE 13 is a right end view of the thermostatic control chassis depicted in FIGURE 5.

Referring to the figures in which similar identification numerals identify the same or similar parts throughout, an embodiment of the invention is illustrated. As may be seen from FIGURE 1, the instant aquarium heater, designated generally by the numeral 10, comprises an elongated heat-resistant tube 11 which is suspended from a housing 12 comprising lower and upper cases 13 and 14 respectively and is provided with a temperature control knob 15 disposed upon the said upper case 14. The aquarium heater 10 is mounted in a conventional manner upon the rim of an aquarium tank, not shown, by means of engagement of clamping screw 16 with the peripheral edge of the tank which is disposed between the end of the clamping screw and a pair of downwardly projecting bosses 17, each of which is disposed forwardly of the clamping screw and laterally of the axis thereof. The lower portion of the heat-resistant tube contains the heating element or cartridge 18 and is immersed below the water level of the tank when in use. Suitable electrically conductive leads 19a and 19b project from the housing 12 for connection to a source of electric power.

As may be additionally seen from FIGURES 3, 4 and 5, the main body of the aquarium heater 10 comprises an elongated tube 11 which is advantageously formed of a heat-resistant glass provided with closed bottom 21 and an open mouth 20 surrounded by an outwardly projecting peripheral flange 22. The tube 11 is suspended through an opening 23 provided in the bottom wall 24 of lower case 13. Lower case 13 comprises a shallow pan-like enclosure having a bottom wall 24 and perimetric upstanding side walls 25 surrounding said bottom wall. The lower case 13 is provided with a depending boss 26 having a screw-threaded aperture within which adjustable clamping screw 16 is threadedly received. The aforesaid pair of depending bosses 17 are additionally provided extending from the bottom wall 24 of the lower case in confronting relation with the end of said clamping screw 16. The arrangement permits the rim of an aquarium tank to be received in the variable clamping space thus formed and to be clamped by the adjustment of clamping screw 16 so as to rigidly support the entire heater assembly upon the aquarium. The upper rim of the perimetric side wall 25 of lower case 13 is provided with a peripheral stepped portion 27 which is adapted to receive and seat the complementary depending side wall 28 of upper case 14. It will be noted that the forward portion of perimetric wall 25 is elevated as indicated at 25a. As heretofore indicated, the bottom wall 24 of the lower case 13 is provided with an opening within which the tube 11 is received and suspended.

As will be seen from the aforesaid FIGURES 3 and 4 and from FIGURE 9, a seating ring 29 surrounds said opening, said seating ring being provided with depending positioning lugs 30 which are received in complementary notches 31 formed in the bottom wall 24. As heretofore indicated, tube 11 is suspended through the aforesaid aperture and is seated against the seating ring 29 by means of the interposition of a gasket 32, which may be of rubber or similar elastomeric material in engagement with the peripheral flange 22 of the tube mouth.

Tube 11 carries a heating element, designated generally by the numeral 18, which is disposed in the lower portion thereof and advantageously comprises a grooved cylindrical body 36 of ceramic or similar material which in turn supports heating coils 37, the terminal ends of which are connected to jacks 38a and 38b respectively, rigidly secured to the ceramic body 36. Supply of electric power to the heating coils is achieved through leads 19a and 40, which terminate in disengageable connecting push pins or plugs 39a and 39b.

The push pins or plugs 39a and 39b are part of a harness which is an important feature of the present invention. This harness, which is depicted in FIGURE 6, is advantageously pre-wired so that it may be disposed as a unit in its operative position upon a thermostatic control chassis, designated generally by the numeral 41. The harness includes the aforesaid leads 19a and 40 which terminate in said plugs 39a and 39b and are connected in series with a resistance 68 and indicating bulb 69.

Lead 40 also extends to eyelet 90 from which it is connected in series to lead 55a and a spark suppressing condenser 53. The latter is connected by lead 55b to eyelet 91 and thence to electrically conductive power supply lead 19b.

It will be noted that when the harness is assembled with the heater in the manner hereafter described, the spark suppressing condenser 53 is shunted across contact members 51a and 51b so as to form the circuit depicted diagrammatically in FIGURE 7.

The chassis support 42 comprises a pair of vertically disposed spaced-apart flanges 43, 43a which are interconnected by means of transverse webs 44 and 45. The lower end of the chassis support 42 is provided with a horizontally extending baffle plate 47 which extends across the tube 11, providing sufficient clearance for the passage of lead wires 19a and 40 and forms a separating partition between the heating element 18 and the thermostatic control chassis 41.

The baffle plate 47 is also provided with a pair of notches 92 disposed laterally of a depending partition 93 which supports a yoke 94. Said yoke 94 has the general conformation of a circular segment provided with a pair of recesses 95 at the ends of said circular segment. The yoke 94 is also formed integrally with a transverse apron 96, each end of which is provided with a horizontal boss 97, the said apron 96, bosses 97 and recesses 95 defining a pair of channels between the area immediately below the baffle plate 47 and the area below the yoke 94.

The flanges 43, 43a of the chassis support 42 are interrupted by notches 100, 101 and 102. Laterally facing bosses 103, 104 are provided upon the external marginal perimeter of each of the flanges 43, 43a and adjacent to the notches 100, 101 and 102. Similarly, a laterally facing boss 105 is provided at the lower end of the flange 43a; and a pair of laterally facing inclined bosses 106 are provided upon the external marginal perimeter of each of said flanges 43, 43a.

A plurality of vertical ribs 110, 111, 112, 113 and 114 are also provided upon the opposing external marginal perimeter of each of the flanges 43, 43a and are spaced alternately of the said laterally facing bosses 103, 104, 104a, 105.

The lower portion of web 45 is provided with a pair of vertical ribs 116 and a circular boss 120. A circular aperture 121 is also provided between said vertical ribs 116.

The said lower portion of web 45 serves as a seat for the adjustable contact member 51a, the said contact member being held in vertical position by the ribs 116 and the circular boss 120 which is received within a circular aperture 122 provided in said adjustable contact member. The adjustable contact member 51a is also secured to the web 45 by a grommet 123 which is housed within the circular aperture 122 and an aligned circular aperture 124 formed in said adjustable contact member. The grommet 123 is composed of an electrically conductive material and also serves as a support for eyelet 90 of the above described harness. In this way the adjustable contact member 51a is maintained in electrical contact with the said eyelet 90 and the leads 40 and 55a attached thereto.

The upper portion of web 45 is laterally offset to form a recess 125 for the reception of the spark suppressing condenser 53. Said upper portion of web 45 is also provided with a stepped element 126 having inwardly and outwardly disposed faces designated respectively by the numerals 126a and 126b. The outwardly disposed face 126b serves as a seat for a bi-metallic contact member 51b, the latter being secured in vertical position by a pair of ribs 127 formed upon said outwardly disposed face. An electrically conductive grommet 128 is housed in said stepped element and disposed centrally of the ribs 127, said grommet 128 also being housed in the contact member 51b, thereby securing the said contact member 51b to the stepped element 126.

Web 44 is disposed in the vicinity of the upper end of the chassis support. Said web 44 is provided with a bifurcated arch including elements 129 and 130 which, together with the web 44, are threadedly engaged with temperature control screw 48. The upper end of chassis support 42 is additionally provided with laterally extending locking flanges 65 and a pair of spaced-apart upwardly projecting locking fingers 49.

It is noteworthy that each of said locking fingers is provided with a downwardly facing horizontal surface 49b which is part of a horizontal flange 50 comprised by each of said locking fingers 49.

As seen in FIGURES 8 and 9, each of the locking fingers 49 has a generally T-shaped conformation and is receivable within a pair of spaced-apart slots 131 provided in the upper case 14. Each of these slots 131 is characterized by edge portions which are complementally abuttable against opposing sides of said T-shaped conformation. The slots 131 are also provided with a pair of ledges 132 which are slidably engageable with the downwardly facing horizontal surfaces 49b of the locking fingers. In a manner hereinafter more fully described, the locking fingers are employed to secure both the lower and upper cases 13 and 14 to the remainder of the device herein described.

The thermostatic control chassis 41 is formed of a molded plastic electrically non-conductive or insulating material. The harness is assembled thereon by disposing the spark suppressing condenser in the recess 125 formed by the upper portion of the web 45. Lead 55a is disposed through notch 100 and between bosses 104a and 105 and rib 114. Said lead 55a is also positioned between the lower end of the flange and the baffle plate 47, the end of said lead 55a being previously secured to eyelet 90.

Lead 55b is disposed through notch 101 and then between bosses 103 and rib 110, the latter being provided with a horizontally projecting member 110a which insures retention of said lead 55b thereon.

Lead 19b is disposed between boss 106 and inclined shoulder 34, and is seated upon rib 111. Said lead 19b and lead 55b are then disposed through notch 102 and are connected to grommet 128 by eyelet 91, the latter having been previously assembled in electrical contact with leads 19b and 55b. The grommet 128 is flanged so as to secure said eyelet 91 against inwardly disposed face 133 which is offset from the inwardly disposed face 126a of the stepped element 126. Grommet 128 is also flanged to secure contact member 51b in the above-described position upon the outwardly disposed face 126b of the stepped element 126. The flanging of said grommet, so as to secure said eyelet 91 and contact member 51b, may be accomplished by conventional means in substantially one operation.

The adjustable contact member 51a is next disposed upon the web 45 in the previously described position and eyelet 90 secured thereto by grommet 123 which is retained in the web 45.

As noted above, the eyelet 90 is secured to the end of lead 55a, such disposition having been accomplished prior to the assembly of the harness with the thermostatic control chassis. The eyelet 90 is also wired with lead 40 as part of the pre-wired assembly of the harness. Hence, connection of the eyelet 90 by the grommet 123 accomplishes in one operation a joint connection of lead 40 and 55a to the adjustable contact member 51a, which is also by way of the same operation, assembled to the lower portion of the web 45.

The lead 40 is disposed between the lower portion of the flange 43 and the baffle plate 47 and is then disposed in plug 39b which is connected by means of jack 38b to the heating coils 37.

Lead 19a is disposed between bosses 104, 104a, 105 and 106, and inclined shoulder 34a and ribs 112, 113 and 114. Said lead 19a is also led past the baffle plate 47 and is connected with plug 39a which is, in turn, connected by means of jack 38a to the heating coils 37.

The leads 69a, 69b to the indicator bulb 69 are shunted across said plugs 39a and 39b and are disposed in spaced-apart relation through channels 98, 98a and notches 92, the leads 69a, 69b also being connected to indicator bulb 69 which is retained in upright confronting relation to the lower portion of the web 45 by arch 46 formed integrally with the stepped element 126, one end of said indicator bulb 69 projecting within said arch 46.

It will be seen from the foregoing that the condenser and all of the leads comprised by the harness, as well as the contact members 51a and 51b, may be rapidly assembled upon the thermostatic control chassis by disposing them in the above-described position after the harness has been pre-wired.

The upper end of the thermostat control chassis 41 is additionally provided with oppositely disposed laterally projecting locking flanges 65, which are provided with oppositely inclined upper cam surfaces 72 respectively and upwardly projecting locking fingers 49, each of which terminates in a latching tooth 50. In assembling the aquarium heater to this point, the heating cartridge 13 is connected to the thermostat control chassis 41 by inserting the prongs 39a and 39b into jacks 38a and 38b respectively and the entire assembly thus formed is then lowered into the heat-resistant tube 11 which is disposed within the aperture 23 of lower case 13. It will be noted that lower case 13 is provided with inwardly projecting cam lugs 74. These lugs are provided with inclined lower cam surfaces for mating contact with the cam surfaces 72 of the laterally projecting locking flanges 54. As a consequence of this arrangement, when the heating cartridge and thermostat control chassis are initially lowered into the tube, the chassis is rotated by grasping the locking fingers so that the locking flanges 65 are out of alignment with the inwardly projecting cam lugs 74 extending into the interior of the lower case. When the locking flanges 65 have been seated on the peripheral flange 22 of the tube 11, the chassis is rotated so that the upper cam surfaces 72 of the locking flanges abut with the lower faces of the cam lugs 74 and the continued rotation of the chassis causes the entire chassis to be wedged and depressed. The pressure of the locking flanges upon the peripheral lip of the tube 11 causes the gasket 32 to be compressed so as to firmly seat the tube on the gasket forming a seal therewith and simultaneously firmly seating and locking the chassis with the lower case. With the cartridge and chassis thus in position seated upon the tube and in locking engagement with the lower case, the upper case may now be locked in position.

The upper case 14, as may be seen from FIGURES 3, 4 and 8, comprises a shallow pan-like enclosure having a peripheral depending side wall 28 which is complementary in configuration to the upwardly directed side wall 25 of the lower case 13. It will be noted that the upper case is provided with a top wall 75 which is provided with a circular depressed central portion 76, including an upwardly directed circular rib 77. The depressed central portion 76 extends to the side edges of the upper case, as indicated at 80. The central depressed portion is also provided with a central perforation 78 through which the splined head 79 of the temperature control screw 48 projects freely when the upper case is in position. Said central depressed portion of the top wall 75 is also provided with the previously described pair of generally T-shaped slots 131. When the upper case is brought into seating engagement with the lower case, the locking fingers 49 are received at one end of said slots 131 and, upon horizontal displacement of the upper case with respect to said locking fingers 49, the horizontal surfaces 49b will slidably engage the ledges 132 of said slots 131, thereby securing the upper case in closed contact with the lower case.

The manual adjustment of the temperature control screw is accomplished externally of the upper case by means of temperature control knob 15. Said knob is advantageously formed of a molded thermoplastic material and comprises a face disc 83 carrying appropriate indicia of higher or lower temperature to be attained upon rotation of the disc 83 in association with the temperature adjusting screw 48 in the manner hereinafter more fully set forth. Said indicia are located on the upper face of the disc 83 adjacent its circumferential edge which is serrated to permit the disc to be readily grasped and rotated. The circumferential edge of the disc is in the form of a depending circumferential flange 85 which is adapted to mate with the upwardly directed circumferential rib 77 on the upper case to form a locating and guide surface for the rotation of the knob. The flange rests in the space between said rib and the wall formed by the circular depression 76. The temperature control knob 15 is further provided with a centrally disposed depending hub 86 which is internally splined to mate with the splined head of temperature control screw 48. By reason of the complemental splined surfaces of the hub and screw head it is possible to mount the temperature control knob by merely lowering it into position thereon and to lock the same against relative rotation. The extension of the circular depression 76 to the side edges of the upper case, as indicated at 80, exposes diametrically opposed portions of the control knob periphery to permit the knob to be rotated to any temperature setting desired. The aperture 82 in the top wall of the upper case allows the illumination from the pilot lamp 69 to be viewed upon removal of face disc 83, if desired.

As has been previously indicated, contact member 51b is seated upon stepped element 126 of the web 45 by means of the grommet 128 and ribs 127. This contact member 51b comprises a strip of electrically conductive material, preferably of metallic composition. Near its upper end, there is provided a contact point 57b disposed in confronting relation to a similar contact point 57a provided near the upper end of adjustable contact member 51a.

The adjustable contact member 51a is seated upon web 45 by means of grommet 123, boss 120 and ribs 116. This adjustable contact member 51a comprises a generally vertical strip of electrically conductive material of metallic composition.

Adjustable contact member 51a includes a lower vertical planar portion 60 seated in the manner previously noted, an offset vertical planar portion 61 disposed so as to avoid contact with the leads 55a, 55b to the spark suppressing condenser 53, an inclined planar portion 62, and an upper vertical planar portion 63 provided with the aforesaid contact point 57a.

The temperature adjusting screw 48 is provided with a conical end 48a which is contactable with the inclined planar portion 62 of the adjustable contact member 51a, so as to dispose its contact point 57a in abutment with the contact point 57b of contact member 51b.

To accomplish the initial setting of the device for operative use in a particular aquarium environment, the unit is mounted on the aquarium tank with which it is intended to operate and the control knob is rotated so as to lower the temperature adjusting screw 48, thereby causing its conical end 48a to bear against the inclined planar portion 62 of the adjustable contact member 51a and to urge the contact point 57a of the latter laterally into electrical connection with the contact point 57b of the contact member 51b. When such connection is achieved, the circuit depicted in FIGURE 7, of which the heating element is a part, will be closed, thereby illuminating the pilot lamp which indicates that the heating element is in operation.

The circuit will remain closed and the heating element will continue in operation until the temperature of the bi-metallic contact member 51b increases so as to cause it to expand and thereby accomplish a breaking of contact between its contact point 57b and the contact point 57a of adjustable contact member 51a. Thereupon, the circuit will be opened so as to permit a corresponding cooling of the heating element and of the surrounding aquarium environment. So also, such opening of the circuit will permit the contact member 51b to cool and thereby contract until its contact point 57b is brought back into electrical connection with the contact point 57a so as to close the circuit and resume its heating function.

The heating element will therefore tend to maintain a constant temperature corresponding with the ability of the contact points 57a, 57b to maintain electrical contact. This ability, in turn, will be determined by the lateral displacement of the adjustable contact member 51a by the conical end 48a of the adjusting screw 48, aid lateral displacement being determined by the particular vertical disposition of the adjusting screw 48 accomplished by rotation of the knob 15 in contact with the inclined planar portion 63 of the adjustable contact member 51a. Hence, it is clear that particular settings of the knob 15 will correspond with the maintenance of a particular temperature of the heating element and a corresponding particular temperature of the aquarium environment.

As a convenience in setting the knob 15 in a particular disposition, an indicia 14a is provided upon the upper external periphery of the upper case 14, said indicia 14a being adjacent to the serrations provided upon the knob.

The electrical circuit of the aquarium heater is illustrated schematically in FIGURE 7, wherein the numbering has been made to correspond to the numbering of the physical components. It will be seen from said schematic diagram that the thermostatic unit is wired so that it is in series with heating element 37 which is interconnected therewith. The heating element is shunted by resistor 68 and indicating bulb 69 which are in series with each other.

The aquarium heater is illustrated in FIGURE 3 in the condition wherein the aquarium has reached the desired temperature and consequently, the deflection of the bi-metallic strip 51b has broken the contacts 57a and 57b. Thus, assuming that the aquarium heater is initially set for 72° F., and the aquarium has reached such temperature, the thermostatic unit will have opened and when the temperature of the aquarium drops, the thermostatic unit again closes, restoring the circuit to the heating coils 37 to elevate the aquarium temperature to the desired level. When such level is again reached, the thermostatic unit opens.

It will be noted from the above circuit diagram, that the power is connected to the aquarium heater through the leads 19a and 19b, and that in view of the series interconnection of the thermostatic switch control unit with the heating coils 37, the contacts of the thermostatic control unit must be closed in order to supply heating current to the heater 37. When the contacts of the thermostatic unit are closed, power will also be supplied to illuminate the indicating lamp 69. It will also be noted that the thermostatic unit is provided with a condenser 53 shunted across the contact points of the thermostatic unit. Thus, condenser 53 is shunted across contact points 57a and 57b through leads 55a and 55b.

This condenser will prevent any sparking which might otherwise occur upon the opening and closing of contact points 57a and 57b.

From the foregoing, it will be apparent that there has been provided a thermostatically controlled aquarium heater which may be assembled from a plurality of sub-assemblies in a very efficient and economical manner. It will be apparent that the heating element or cartridge 18 is assembled as a unit, as is the thermostatic control chasses 41. These sub-assemblies are then assembled in the manner heretofore described in conjunction with the pilot lamp assembly, upper and lower case, safety cover and control knob, etc.

It will be noted that no tools are required for the assembly of the aquarium heater as a whole and that means are provided for disengagedly interconnecting the parts so that the entire unit may be assembled or disassembled as desired and the sub-assemblies or parts thereof replaced. This can be accomplished either at the factory or by the consumer without any difficulty and without the use of any extraneous fastening means. It will be noted that the arrangement permits the utilization of molded parts to great advantage and that the arrangement is such that aquarium water is prevented from entering the unit and any water spilled thereon is readily shed therefrom without entering the heater. Although the aquarium heater has been described with reference to the assembly procedure, it is merely necessary to reverse this procedure in order to disassemble it for the purpose of replacement or repair. Thus, the simplicity of this procedure will be apparent. It is merely necessary to lift off the control knob, slide the upper case horizontally to permit the ledges 132 to clear the teeth 50 to thereby release them from engagement with the upper case 14, which may then be lifted away. The thermostat control chassis 41 and heating cartridge 19 may then be removed from the tube 11 by grasping the locking fingers 49 and rotating them so that the locking flanges 65 are moved out of engagement with cam lugs 74. The thermostat control chassis and heating cartridge may then be lifted out of the tube as a unit. The pilot lamp assembly and heating cartridge may then be disengaged from the thermostat control chassis and these sub-assemblies may then be replaced as a whole, or, if desired, components thereof may be repaired and the unit re-assembled. Thus, not only are there economies achieved in the manufacture of the unit, but the servicing thereof by inexperienced personnel or consumers is simplified and can be achieved at minimum cost.

While I have here shown and described a preferred embodiment of my invention, it will be apparent however that this invention is not limited to this embodiment and that many changes, additions and modifications can be made in connection therewith without departing from the spirit and scope of the invention as herein disclosed and hereinafter claimed. Having described my invention what I claim as new and desire to secure by Letters Patent is:

1. An improved aquarium heater comprising, in combination, a housing and a tubular enclosure depending therefrom, an electrical heating element and a thermostatic control chassis therefor disposed within said tubular enclosure, said thermostatic control chassis being provided with adjustable means for opening and closing an electrical circuit associated with said electrical heating element, said thermostatic control chassis also supporting a unitary harness forming part of said electrical circuit, said unitary harness including means for suppressing sparking when the said electrical circuit is opened and closed, means for indicating the flow of electrical current through said electrical circuit, said chassis also being provided with locking fingers projecting into said housing for engagement with complementary locking means carried by a portion of said housing, said adjustable means for opening and closing an electrical circuit associated with said electrical heating element including a bi-metallic contact member secured upon the said chassis in confronting relation to an adjustable contact member also secured upon the said chassis, said chassis being provided with means for laterally displacing said contact member into contact with said bi-metallic contact member, said housing being provided with means flush mounted therein for adjusting said laterally displacing means, said bimetallic contact member and adjustable contact member being mounted upon opposite sides of a web included within said chassis, said means for suppressing sparking when the said electrical circuit is opened and closed including a condenser shunted across the said contact members and disposed within a recess provided upon said web, said means for indicating the flow of electrical current through said electrical circuit including a bulb shunted across the said heating element, said bulb being seated upon the said chassis, said chassis being provided with an arch housing one end of said bulb, said chassis also provided with a baffle plate formed with a depending partition straddled by a pair of notches, said depending partition supporting a horizontal yoke, said bulb being provided with a pair of leads disposed through said notches and upon said yoke, said leads being separated from each other by said notches and yoke, and said leads being connected to a pair of plugs disengageably secured in shunted relation to said heating element.

2. An improved aquarium heater comprising, in combination, a two-part housing and a tubular enclosure depending therefrom, an electrical heating element and a thermostatic control chassis therefor disposed within said tubular enclosure, the said thermostatic control chassis being provided with adjustable means for opening said closing an electrical circuit associated with said electrical heating element, the said theromstatic control chassis also supporting a unitary harness forming part of said electrical circuit, said unitary harness including means for suppressing sparking when the said electrical circuit is opened and closed, and means for indicating the flow of electrical current through said electrical circuit, the said chassis also being provided with locking fingers projecting into said housing for engagement with complementary locking means carried by a portion of said housing, and the said complementary locking means including transversely extending locking flanges for engagement with one part of said housing and vertically projecting locking fingers for engagement with the other part of said housing to thereby retain said housing parts in assembled relation, the last-mentioned housing part being provided with a pair of slots each characterized by a ledge engageable with a horizontal locking tooth provided upon each of said locking fingers.

3. A device, according to claim 2, the said locking fingers having a generally T-shaped conformation, the said slots being complementally engageable with said locking fingers in open and closed positions to permit removal and assembly of said last-mentioned housing part.

4. A device according to claim 3, the said last-mentioned housing part seating a rotatable knob axially secured to said adjustable means for opening and closing said electrical circuit associated with said heating element.

References Cited in the file of this patent
UNITED STATES PATENTS

| | | |
|---|---|---|
| 2,477,363 | Danner | July 26, 1949 |
| 2,666,838 | Krah et al. | Jan. 19, 1954 |
| 2,699,488 | Arak et al. | Jan. 11, 1955 |
| 2,839,660 | Davies | June 17, 1958 |